United States Patent
Heda et al.

(10) Patent No.: US 10,051,235 B2
(45) Date of Patent: *Aug. 14, 2018

(54) MAINTAINING AUDIO VIDEO CONFERENCE CONTINUITY

(71) Applicant: International Business Machines Corporation, Armonk, NY (US)

(72) Inventors: Sneha J. Heda, Ahmednagar (IN); Sagar D. Joshi, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/359,640

(22) Filed: Nov. 23, 2016

(65) Prior Publication Data

US 2017/0078617 A1    Mar. 16, 2017

Related U.S. Application Data

(63) Continuation of application No. 14/228,800, filed on Mar. 28, 2014, now Pat. No. 9,516,268.

(51) Int. Cl.
*H04N 7/15* (2006.01)
*H04N 7/14* (2006.01)
*H04L 12/18* (2006.01)

(52) U.S. Cl.
CPC ........... *H04N 7/15* (2013.01); *H04L 12/1822* (2013.01); *H04N 7/147* (2013.01)

(58) Field of Classification Search
CPC ............... G06F 11/202; G06F 11/2033; G06F 11/2025; G06F 11/2028; G06F 11/2097
See application file for complete search history.

(56) References Cited

U.S. PATENT DOCUMENTS 6,195,680 B1    2/2001    Goldszmidt et al.
6,839,865 B2    1/2005    Gould et al.
(Continued)

FOREIGN PATENT DOCUMENTS

WO    2004073241 A3    8/2004

OTHER PUBLICATIONS

"Cisco TelePresence Conductor with Cisco TelePresence Management Suite—Deployment Guide", Cisco, XC1.2, TMS 14.1, D15001.02, Aug. 2013, Copyright 2013 Cisco Systems, Inc., <http://www.cisco.com/en/US/docs/telepresence/infrastructure/tms/config_guide/TelePresence_Conductor_with_Cisco_TMS_Deployment_Guide_XC1-2_TMS14-1.pdf>.

(Continued)

*Primary Examiner* — Jigar Patel
(74) *Attorney, Agent, or Firm* — Daniel R. Simek (57) ABSTRACT

A computing device receives session description protocol (SDP) information including network parameters, from a plurality of client devices participating in an audio-video conference hosted by a primary conference host. The computing device selects a secondary conference host from the plurality of client devices. In response to receiving the SDP information from the plurality of client devices, the computing device sends a reply, including network parameter information identifying the secondary conference host, to the plurality of client devices of the audio-video conference. The computing device determines a failure of the primary conference host, wherein the failure is based, at least in part, on a violation of a threshold limit of a transmission rate of the primary conference host, and in response to determining the failure, the computing device sends information to activate the secondary conference host as the audio-video conference host, to the plurality of client devices.

20 Claims, 5 Drawing Sheets

(56) References Cited

U.S. PATENT DOCUMENTS

| | | | |
|---|---|---|---|
| 6,879,565 B2 | 4/2005 | Baxley et al. | |
| 6,948,088 B1* | 9/2005 | Sharan | H04L 12/2801 |
| | | | 714/6.31 |
| 7,937,442 B2 | 5/2011 | Sekaran et al. | |
| 8,279,780 B2 | 10/2012 | Yamamoto | |
| 8,339,997 B2 | 12/2012 | Dye et al. | |
| 8,401,032 B2 | 3/2013 | Hundscheidt et al. | |
| 8,467,319 B1 | 6/2013 | Jones et al. | |
| 2005/0138476 A1* | 6/2005 | Taylor | H04L 41/0659 |
| | | | 714/37 |
| 2005/0229034 A1* | 10/2005 | Fujibayashi | G06F 11/0727 |
| | | | 714/11 |
| 2006/0039388 A1 | 2/2006 | Shur et al. | |
| 2007/0294425 A1* | 12/2007 | Sobti | H04M 3/02 |
| | | | 709/231 |
| 2008/0013447 A1 | 1/2008 | Lauber | |
| 2008/0069011 A1 | 3/2008 | Sekaran et al. | |
| 2011/0286365 A1 | 11/2011 | Simoes et al. | |
| 2012/0180121 A1* | 7/2012 | Yussouff | H04L 65/1069 |
| | | | 726/15 |
| 2013/0084063 A1* | 4/2013 | Hu | H04L 49/10 |
| | | | 398/2 |
| 2014/0267577 A1* | 9/2014 | Weber | H04L 12/1822 |
| | | | 348/14.09 |
| 2014/0267677 A1 | 9/2014 | Weber et al. | |

OTHER PUBLICATIONS

"How to Implement Multipoint Video Using WebRTC: Introduction" Jan. 21, 2013, Tips for developers, VoIP, copyright 2013 BlogGeek.me, http://bloggeek.me/multipoint-webrtc-intro/>.

"How to Implement Multipoint Video Using WebRTC: Small Groups", Feb. 5, 2013, VoIP, Copyright 2013 BlogGeek.me, <http://bloggeek.me/webrtc-multipoint-small-groups/>.

"Preparing for Disruption with WebRTC", Constellation Research Inc., May 27, 2013, <http://www.constellationr.com/content/preparing-disruption-webrtc>.

Spielvogel et al., "Collaborative Quality-of-Service based video conferencing", IEEE Xplore Digital Library, 14th International Conference on Computer Supported Cooperative Work in Design (CSCWD), Apr. 14-16, 2010, pp. 161-165, ISBN 978-1-4244-6763-1, <http://ieeexplore.ieee.org/xpl/articleDetailsjsp?tp=&arnumber=5471984&queryText%3Davoid+abrupt+Audio+Video+conference+failures>.

* cited by examiner

MAINTAINING AUDIO VIDEO CONFERENCE CONTINUITY

FIELD OF THE INVENTION

The present invention relates generally to the field of transmitting real-time multimedia content over a network to multiple recipients, and more particularly to maintaining connection of client devices in a real-time streaming audio-video conference.

BACKGROUND OF THE INVENTION

Real-time streaming technology may be used to deliver multimedia content simultaneously to participants of a network-based communication. Multimedia content may include audio, video, graphics, animation, images, text, etc., as content. To be effective, streaming multimedia is presented in a continuous fashion, and excessive delays or missing content can be detected by participants. Often, buffering techniques are used to enable a consistent presentation of content, given an inconsistent transmission and receipt of content.

Multimedia content transmitted real-time to multiple recipients, which includes audio and video content, may be referred to as audio-video conferencing. Audio-video conferencing offers advantages such as real-time communication capability between multiple participants, without the delay, cost, scheduling, and travel time of face-to-face meetings. Audio-video conferencing may make use of the Internet and associated Internet protocols to deliver content to the multiple participants of the conference. This greatly extends the connection capability of audio-video conferencing to a world wide range; however, the quality of service in transmitting real-time streaming data over the Internet cannot be guaranteed, and disruptions may be frequently experienced. In some cases the disruption may be short in duration, but many participants of audio-video conferencing have had experiences in which the real-time streaming of data failed and the conference was abruptly terminated.

SUMMARY

Embodiments of the present invention disclose a method, computer program product, and system for maintaining an audio-video conference. A computing device receives session description protocol information including network parameters, from a plurality of client devices participating in an audio-video conference hosted by a primary conference host. The computing device selects a secondary conference host from the plurality of client devices. In response to receiving the session description protocol information from the plurality of client devices, the computing device sends a reply, including network parameter information identifying the secondary conference host, to the plurality of client devices participating in the audio-video conference. The computing device determines a failure of the primary conference host affecting the audio-video conference, wherein the failure is based, at least in part, on a violation of a threshold limit of a transmission rate of the primary conference host, and in response to determining the failure, the computing device sends information associated with activating the secondary conference host as a host of the audio-video conference, to the plurality of client devices participating in the audio-video conference.

DETAILED DESCRIPTION

Embodiments of the present invention recognize that existing solutions for audio-video conference delivery failure, resulting in abrupt dropping of real-time transmitted content to conference participants, require duplicate hardware and other resources to re-establish audio-video conference (hereafter "conference") transmission drops and interruptions. In addition, such solutions result in conference time being lost due to time required for renegotiation of session parameters.

Embodiments of the present invention identify one client device from a plurality of client devices, otherwise referred to as client endpoints participating in the conference, which may become the host of the conference, and prevent disruption or termination of the conference. Since existing resources are leveraged to resolve the interruption of real-time content transmission, duplication of hardware and other resources are not needed, making the solution cost effective.

During the initiation of the conference, registered client endpoints attempt to join the audio-video conference. Then each client endpoint sends its network information as well as a list of supported compression-decompression (codecs) formats as part of its session description protocol (SDP), to the multipoint control unit (MCU). At least one client endpoint connected and participating in the conference is properly configured to perform audio-video mixing, and receives the necessary information enabling the selected client endpoint to provide hosting functions for the conference in the event that the MCU experiences hardware or software failure, loses network connection, or fails to maintain an acceptable frame rate/bit rate of streaming content for the conference. Additionally the audio-video server, also referred to as a conference manager server, is capable of identifying the best-suited conference client endpoint to host the conference in the event of conference content disruption.

The MCU completes negotiations by replying back to the client endpoints with the SDP response, setting up the connection between the MCU as the primary conference host, and the client endpoints. The conference manager server caches all the client endpoint network information. The client endpoint that is the conference moderator, is typically chosen by the conference manager server as the initial conference hosting candidate (CHC), which will serve as a secondary conference host. The conference manager will include the CHC's network information in the SDP responses that are sent to all participating client endpoints.

During an audio-video conference call, an MCU health monitor (MHM) operated by the conference manager continually polls the connectivity of the MCU and the MCU bitrate/frame rate of the conference content. Each of the client endpoints connected to the conference knows the network information of the moderator chosen as the secondary conference host. If a change occurs during the call, in which the moderator (CHC) leaves the conference, or the network performance associated with the initially chosen CHC violates an established pre-determined threshold, the MHM will detect this change and alert the conference manager to choose a new CHC.

The conference manager will choose the most eligible CHC from the client endpoint participants remaining connected to the audio-video conference. The eligibility of selecting the CHC may be based on the role associated with the client endpoint (e.g. manager, alternate moderator, conference owner), in which a role having a higher level of privilege would be chosen over a lower privilege role. The CHC eligibility may be based on the network performance associated with the client endpoint, or a combination of both role and performance. The network information of this new CHC along with information concerning reduced conference line rate will be communicated by renegotiation of SDP with all the client endpoints, including notifying the new CHC of its role.

When the audio-video conference begins, initially the audio and video data will be exchanged between each client and the MCU as the primary conference host. The MHM monitors the conference by polling and determining the connectivity of the MCU, and the health of the MCU transmissions. Whenever the MHM detects a failure of the MCU, such as hardware or software failure, a loss of network connectivity, a bit rate/frame rate, or sampling rate that violates an pre-determined threshold, a notification is sent to all the clients including the CHC, regarding the failure. The CHC will activate its audio-video mixer component and all the clients will resume sending the real-time transport protocol (RTP) data, however it is now sent to the CHC performing the audio and video mixing as the secondary conference host. Depending on the network bandwidth experienced, the client-side hosting by the CHC may proceed with a reduced bit rate/frame rate, or remove video transmission, in order to use the available resources efficiently and prevent abrupt loss of the conference.

If an MHM, monitoring the MCU connectivity and transmission rate of the content, detects a content disruption, such as hardware or software failure, loss of network connectivity, a bit rate/frame rate, or sampling rate that violates a threshold, the conference hosting is transferred to the client endpoint identified by the conference manager server as the CHC, and the conference continues.

Figure 1:
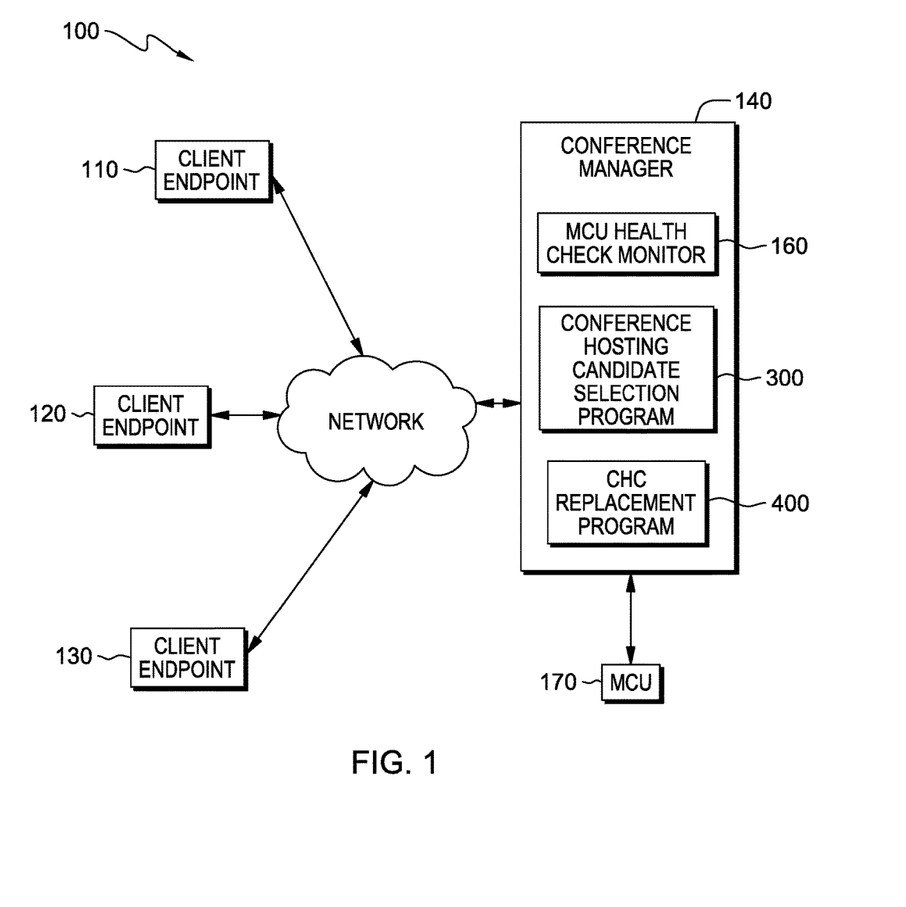
FIG. 1 is a functional block diagram illustrating a distributed audio-video conference environment, in accordance with an embodiment of the present invention.

Implementation of embodiments of the present invention may take a variety of forms, and exemplary implementation details are discussed subsequently with reference to the Figures. FIG. 1 provides only an illustration of one embodiment and does not imply any limitations with regard to the environments in which different embodiments may be implemented. FIG. 1 is a functional block diagram illustrating a distributed audio-video conference environment, generally designated 100, in accordance with one embodiment of the present invention. FIG. 1 includes client endpoints 110, 120, and 130, conference manager 140, and multipoint control unit (MCU) 170, all interconnected over network 150.

Network 150 can be, for example, a local area network (LAN), a wide area network (WAN), such as the Internet, or a combination of the two, and can include wired or wireless connections. Network 150 can be a communication fabric within or between computer processors, such as a PCIe bus. Network 150 interconnects client endpoints 110, 120, and 130, to conference manager 140 and MCU 170. In general, network 150 can be any combination of connections and protocols that will support communications via various channels between computing devices 110, 120, 130, and conference manager server 140, within distributed audio-video conference environment 100, in accordance with an embodiment of the present invention.

Conference manager 140 is a computing device that identifies and registers client endpoints, for example client endpoints 110, 120, and 130, which are connecting to an audio-video conference. In one embodiment of the present invention, conference manager 140 receives audio-video conference input from client endpoints 110, 120, and 130, and sends the information to MCU 170. In another embodiment, conference manager 140 is connected via network 150 to MCU 170 (not shown), and also receives audio-video conference input sent to MCU 170 from client endpoints 110, 120, and 130. Conference manager 140 also receives audio-video conference information replies from MCU 170 and caches or stores the information from MCU 170 to client endpoints 110, 120, and 130.

Conference manager 140 includes MCU health-check monitor (MHM) 160, which polls the network connectivity and the stream of conference data from MCU 170 and determines network connectivity of the MCU and that the rate of data streaming is acceptable with respect to an established threshold of bit rate/frame rate of streaming data. MHM 160 can detect the loss of network connectivity of MCU 170 and the failure of MCU 170 to meet the bit rate/frame rate threshold and trigger a notification to conference manager 140 to take appropriate actions.

Conference manager 140 also includes conference hosting candidate selection program 300, and CHC replacement program 400. Conference hosting candidate selection program 300 responds to detection of a failing audio-video conference transmission rate by transferring the conference hosting operation tasks to a conference participating client endpoint. Conference hosting candidate selection program 300 receives IP network information, which may include network performance metrics, from client endpoints connecting to the conference along with session description protocol (SDP) information. Conference hosting candidate selection program 300 may also receive or have access to profile information associated with users of client endpoints connecting to the conference. Client endpoint user profiles and client endpoint network performance information are used by conference hosting candidate selection program 300 in determining a conference hosting candidate among the client endpoints connected to the conference.

In one embodiment of the present invention, initially, if a conference moderator is identified, conference hosting candidate selection program 300 selects the client endpoint of the conference moderator as the secondary conference host, which is the initial CHC, unless known network performance issues associated with the moderator's client endpoint or IP determine otherwise. In another embodiment of the present invention, conference hosting candidate selection program 300 selects a CHC based on consideration of a privileged role associated with the client endpoint or a user of the client endpoint, or the network performance associated with the client endpoint, or both. A privileged role may include information indicating the user of the client endpoint is a manager, moderator, topic facilitator, or conference owner, and may be included in a profile accessible by conference hosting candidate selection program 300. Network performance may be determined from live or historic network data associated with the client endpoint.

Upon receiving confirmation from MHM 160 that the network connection of MCU 170 has been lost, hardware or software failure has occurred, or that the transmission rate of the conference content stream has violated a pre-determined threshold, conference hosting candidate selection program 300 transfers operational activities of conference hosting to the previously selected secondary conference host or initial CHC, to avoid disruption or termination of the audio-video conference. Conference hosting candidate selection program 300 sends notification of the transfer of audio-video conference hosting to the CHC and the other endpoint clients. The CHC activates its audio-video mixer component and all the client endpoints connected to the conference resume sending their real-time transfer protocol data to the CHC, and the CHC transmits the mixed conference content to the client endpoints, and the conference continues.

CHC replacement program 400 selects a tertiary conference host or a new CHC to perform conference hosting if the secondary conference host, or initial CHC fails. CHC replacement module 400 monitors the connection of the CHC to detect if the CHC leaves, is inadvertently dropped from the conference, or if network performance of the CHC connection is unable to perform hosting functions. If CHC replacement program 400 determines that the CHC is unable to host the conference, CHC replacement program 400 selects a new CHC from the other client endpoints connected to the conference.

MCU 170 is a multipoint control unit, a device commonly used to bridge audio-video conferencing connections, and serves as the primary conference host. MCU 170 is an endpoint on a network and provides capability to receive conference input content and distribute the content to multiple participating endpoints. Because the audio-video conference is streaming data in real-time, the network connectivity and the bit rate/frame rate of MCU 170 must be maintained to provide a comprehensible and effective conference. Audio and video digital content is compressed to reduce bandwidth for transmission of a data stream to conference participants.

MCU 170 may use session initiation protocol (SIP) which is a signaling communications protocol widely used for controlling multimedia communication sessions such as voice and video calls over Internet Protocol (IP) networks. The protocol defines the messages that are sent between peers which govern establishment, termination and other essential elements of a call. SIP can be used for creating, modifying and terminating sessions consisting of one or several media streams. SIP works in conjunction with several other application layer protocols that identify and carry the session media. Media identification and negotiation by MCU 170 is achieved with the use of session description protocol (SDP). For the transmission of media streams (voice, video) SIP typically employs the Real-time Transport Protocol (RTP) or Secure Real-time Transport Protocol (SRTP).

MCU 170 receives the initial session description protocol (SDP) information from participating client endpoints that includes the Internet protocol (IP) address and ports the endpoint will use, as well as the compression and decompression (codec) formats available to the client endpoint. The MCU negotiates the conference session codec and access details to prepare for the content transmission of the audio-video conference.

Client endpoints 110, 120, and 130 are computing devices capable of sustaining the audio-video conference as a conference hosting candidate (CHC). In embodiments of the present invention, client endpoints 110, 120, and 130 are configured with hardware and/or software components capable of receiving streaming audio-video content, mixing the audio and video content, and transmitting the mixed content to the other client endpoint participants of the conference, if chosen as a CHC. Client endpoints 110, 120, and 130 make use of real-time transport protocols (RTPs) and user datagram packets (UDP) to manage audio-video conference data content transmission. Additionally, real-time transport control protocol (RTCP) is used by client endpoints as a quality control protocol for detecting errors during data streaming.

Client endpoints 110, 120, and 130 can be a laptop computer, tablet computer, netbook computer, personal computer (PC), a desktop computer, a personal digital assistant (PDA), a smart phone, or any programmable electronic device capable of operating conference hosting candidate selection program 300 and CHC replacement program 400, receiving, mixing and transmitting audio-video streaming content to other client endpoints within the conference via network 150, and with various components and other devices within distributed database environment 100 (not shown). Client endpoints 110, 120, and 130 include internal and external hardware components, as depicted and described in further detail with respect to FIG. 5.

SDP is a format for describing streaming media initialization parameters. Streaming media is multimedia that is constantly received by and presented to an end-user while being delivered by a provider. The bit rate is the number of bits that are conveyed or processed per unit of time. The bit rate is quantified using the bits per second (bit/s or bps) unit. Frame rate is the frequency at which an imaging device produces or transmits consecutive images called frames. The terms apply to the transmission of audio and/or video in a network streaming application, such as in audio-video conferencing.

Figure 2A:
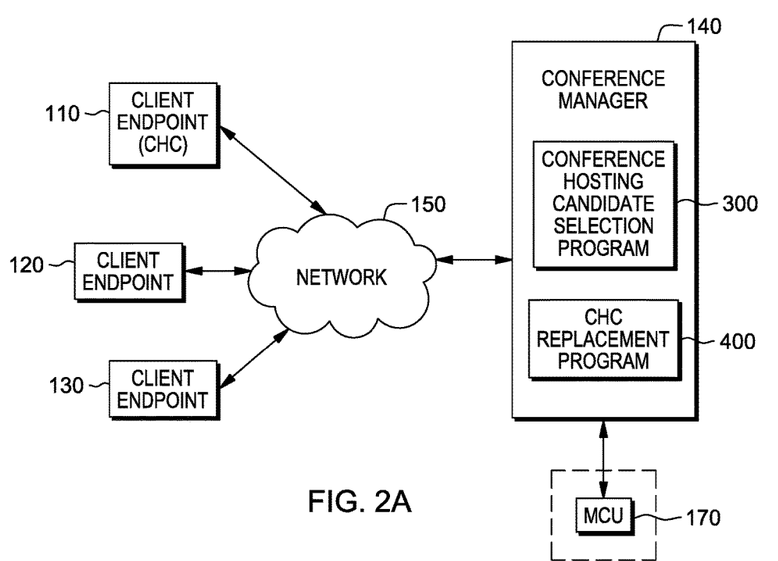
FIG. 2A is a functional block diagram depicting a multipoint control unit (MCU)-hosted audio-video conferencing environment of FIG. 1, in accordance with an embodiment of the present invention.

FIG. 2A is a functional block diagram depicting an MCU hosted audio-video conferencing environment of FIG. 1, in accordance with an embodiment of the present invention (MHM not shown). Client endpoints 110, 120, and 130 are connecting to an audio-video conference via network 150. The conference hosting functions are performed by MCU 170, also referred to as the primary conference host, connected to conference manager server 140, as represented by the dashed line surrounding MCU 170. In one embodiment of the present invention, conference manager server 140 receives SDP data from client endpoints 110, 120, and 130 as well as network IP and port information, and supplies the received data to MCU 170 and conference hosting candidate selection program 300 residing on conference manager 140. Conference hosting candidate selection program 300 selects a secondary conference host, hereafter referred to as the initial conference hosting candidate (CHC), from the client endpoints connected to the conference, for example client endpoint 110 is selected as the CHC. MCU 170 negotiates the codecs to use with each client endpoint, sends a reply to each client endpoint with the negotiated codec formats, and begins performing the codec and mixing functions supporting the audio-video conference. The conference continues with MCU 170 supporting the hosting functions of the conference.

Figure 2B:
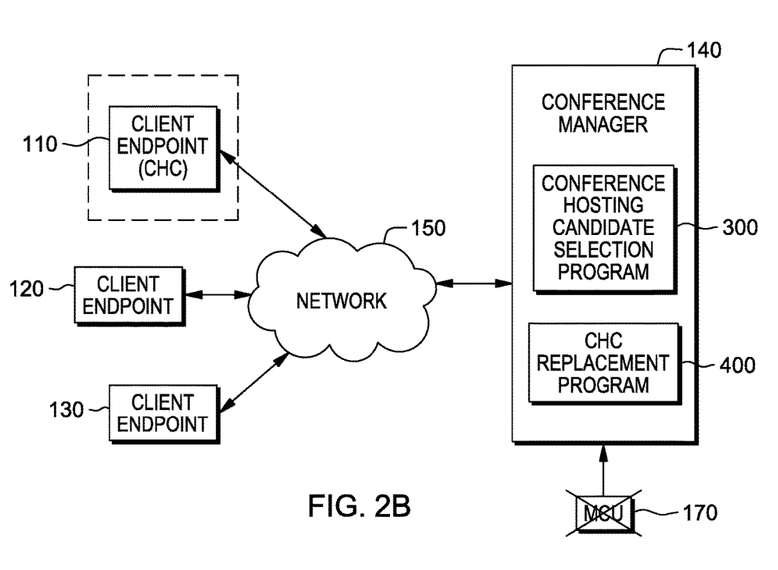
FIG. 2B is a functional block diagram depicting a hosting transition to a client endpoint of the audio-video conference environment of FIG. 1, in accordance with an embodiment of the present invention.

FIG. 2B is a functional block diagram depicting a hosting transition to a client endpoint of the audio-video conference environment of FIG. 1, in accordance with an embodiment of the present invention (MHM not shown). Client endpoint 110 was selected by conference hosting candidate selection program 300 as the CHC. During the conference, the MHM (see FIG. 1), residing on conference manager 140, detects at least one of a hardware or software failure of MCU 170, the loss of network connectivity of MCU 170, or the bit rate/frame rate of MCU 170 falling below a pre-determined threshold rate for a particular duration. This is indicated by the cross-out lines on MCU 170. Conference hosting candidate selection program 300, monitoring the MHM, detects the failure of MCU 170 and initiates the transfer of hosting functions from MCU 170 to the CHC, client endpoint 110. This is indicated by the dashed line surrounding client endpoint 110. The connected client endpoints, such as client endpoints 120 and 130, are notified of the transfer and begin to resume sending the RTP data to the CHC, instead of the failed MCU 170. Client endpoint 110 is notified by conference hosting candidate selection program 300 of the transfer of hosting functions, and client endpoint 110 receives RTP data from the connected client endpoints that are participating in the conference, and performs mixing and distribution functions of the conference content. CHC replacement program 400 monitors the MHM and if a failure of the initial CHC, client endpoint 110, is detected, CHC replacement program 400 selects a new CHC, which becomes the tertiary conference host. CHC replacement program 400 notifies the client endpoints connected to the conference that the new CHC assumes the role of the conference host.

Figure 3:
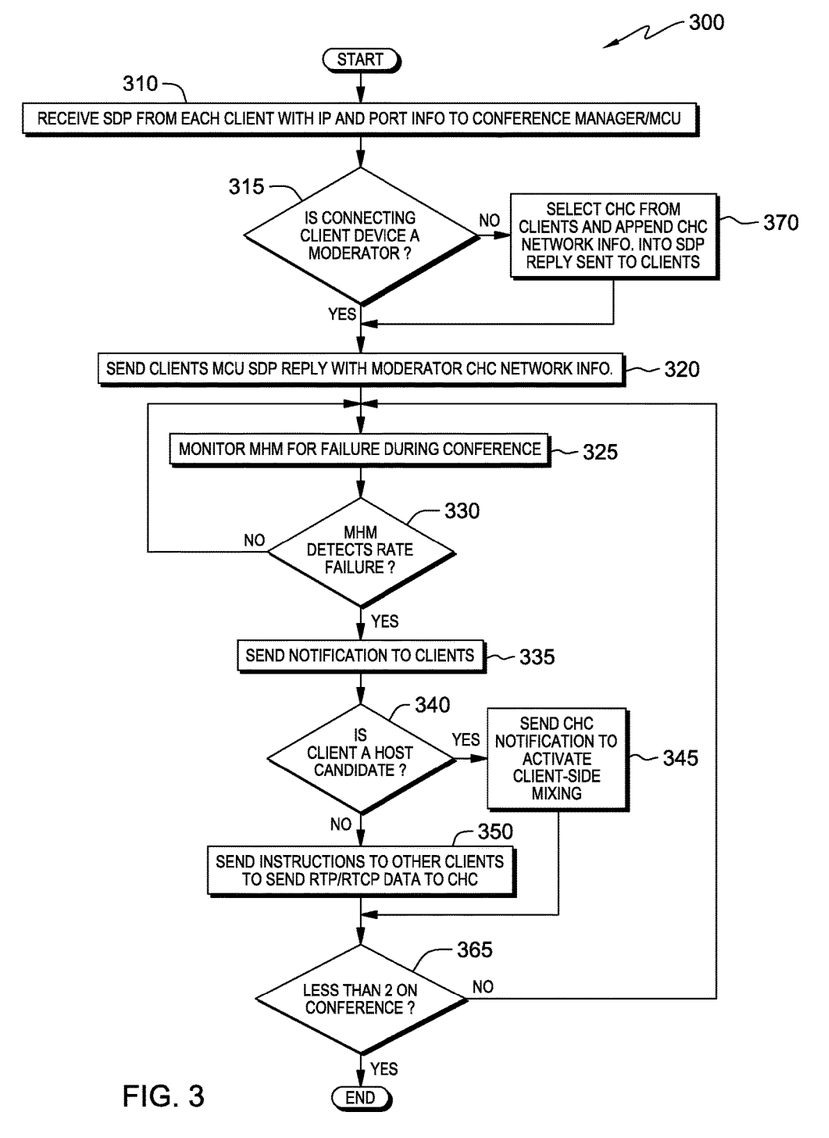
FIG. 3 illustrates operational steps of a conference hosting candidate selection program, inserted on a computing device within the audio-video conferencing environment of FIG. 1, in accordance with an embodiment of the present invention.

FIG. 3 illustrates operational steps of conference hosting candidate selection program 300, inserted on a computing device within the audio-video conferencing environment of FIG. 1, in accordance with an embodiment of the present invention. At the initiation of the audio-video conference, when client endpoints are connecting to the conference manager, typically by a network link, each client sends SDP information along with its IP and port information to the conference manager server, which sends the information to the MCU (step 310). As client endpoints connect to the conference, conference manager server 140 receives the SDP data from each client forwarding the data to MCU 170 for codec negotiation. Conference hosting candidate selection program 300 receives the SDP information, and the network IP and port number information, used for connection to the conference, for each of the client endpoints connecting to the conference.

For example, conference manager 140 receives SDP and network IP and port number information from client endpoint 110. Conference manager 140 forwards the SDP data to MCU 170 for codec negotiation and conference hosting candidate selection program 300 receives the SDP and network information of client endpoint 110. Similarly, SDP and network information is received by conference manager 140, from client endpoints 120 and 130, and conference manager 140 forwards the SDP data to MCU 170 and conference hosting candidate selection program 300 receives the SDP and network information of client endpoints 120 and 130.

Conference hosting candidate selection program 300 determines if a connecting client endpoint corresponds to a moderator for the conference (decision step 315), and determining that a connecting client endpoint is associated with a moderator role (step 315, "YES" branch), conference hosting candidate selection program 300 sends clients an MCU SDP reply message including the CHC network information (step 320). Conference hosting candidate selection program 300 may determine if a connecting client endpoint is associated with a moderator role by accessing a profile of the client or identified user of the client endpoint. Alternatively, a moderator role may be identified by associating the user of the client endpoint with the media access control (MAC) address or the network IP address of the client endpoint, for example. The MAC address or IP address may have been identified and included as part of conference scheduling, or may be accessible from look-up tables.

Determining that a client endpoint connecting to the conference is associated with a moderator role, conference hosting candidate selection program 300, in one embodiment of the present invention, selects the moderator client endpoint as the CHC and includes in the MCU reply to the SDP data negotiations for each client, the network information of the CHC. Additionally, conference hosting candidate selection program 300 may identify the CHC client endpoint to the other client endpoints connected to the conference, as the potential hosting device of the conference if transmission problems of streaming audio/video content are detected.

If it is determined that connecting client endpoints are not associated with being a moderator of the conference, (step 315, "NO" branch), conference hosting candidate selection program 300 selects a CHC from the connecting client endpoints, and appends the CHC network information into the SDP reply sent to the client endpoints (step 370).

Conference hosting candidate selection program 300 may select the CHC based on privileged roles that are be associated with a client endpoint, or user of a client endpoint. For example, a privileged role may be a manager, a moderator, a conference facilitator, a subject matter expert, or another role designation that may be associated with the conference. Additionally, conference hosting candidate selection program 300 may consider network performance associated with client endpoints, choosing a client endpoint with superior network performance to support conference streaming audio-video content data.

Conference hosting candidate selection program 300 monitors the MHM as the conference begins (step 325). The MHM detects the connectivity of MCU 170 and the transmission rate of streaming content data and is able to detect an MCU failure, which occurs if there is a hardware or software failure, the frame rate/bit rate of the transmissions violates a pre-determined threshold, or in the event that network connectivity of MCU 170 is lost. If the frame rate/bit rate is too low, the delivered conference content may be unintelligible as received by the client endpoints. If the frame rate/bit rate is too high, content may be missed as buffers fill to capacity, again disrupting the conference, and if the network connectivity of MCU 170 is lost, the conference transmissions will stop abruptly. Conference hosting candidate selection program 300 continues monitoring for the duration of the conference, awaiting notification by the MHM if a failure of MCU 170 is detected.

While monitoring the MHM, conference hosting candidate selection program 300 determines if a notification of an MCU failure has been detected (decision step 330). Confirming that a notification of an MCU failure has not been detected (step 330, "NO" branch), conference hosting candidate selection program 300 continues to monitor the MHM to determine if there is a hardware or software failure, a loss of network connectivity, or the streaming content bit rate/frame rate violates a pre-determined threshold, during the conference (return to step 325).

Confirming that a notification of an MCU failure has been detected (step 330, "YES" branch), conference hosting candidate selection program 300 sends a notification to client endpoints (step 335). Each client endpoint connected to the conference is sent a notification of the transfer of hosting functions from the MCU to the CHC, by conference hosting candidate selection program 300. Each client endpoint received the network information associated with the CHC, along with the negotiated codec format information reply from MCU 170, while initially connecting to the conference. Each client endpoint uses the previously received CHC network information to establish connection to the CHC.

In sending notification to each of the client endpoints, conference hosting candidate selection program 300 determines if the client is the CHC (decision step 340), and determining that the client is the CHC (step 340, "YES" branch), conference hosting candidate selection program 300 includes information sent to the CHC to activate client-side mixing (step 345). The CHC becomes the conference host and receives all streaming input from client endpoints, performs audio/video mixing and compression/decompression (codec) of the streaming content, and sends the mixed streaming content back to the client endpoints, which are connected to the conference.

If conference hosting candidate selection program 300 determines that the client is not the CHC, (step 340, "NO" branch), conference hosting candidate selection program 300 sends instructions to the other client endpoints, to send RTP/RTCP data to the CHC, (step 350). Receiving the instructions, each client endpoint begins sending RTP data to the CHC, and uses RTCP to monitor the quality of service of the transmissions and aids in synchronization of multiple streams.

Having sent information and instructions to the current CHC and client endpoints, conference hosting candidate selection program 300 checks if there are less than two client endpoints connected to the conference (decision step 365), and determining that less than two client endpoints are connected to the conference (step 365, "YES" branch), conference hosting candidate selection program 300 ends. However, if conference hosting candidate selection program 300 determines that there are two or more client endpoints connected to the conference, (step 365, "NO" branch), conference hosting candidate selection program 300 monitors the MHM for hardware or software failure, network connectivity loss, or failure of transmission frame rate/bit rate during the conference (return to step 325).

Figure 4:
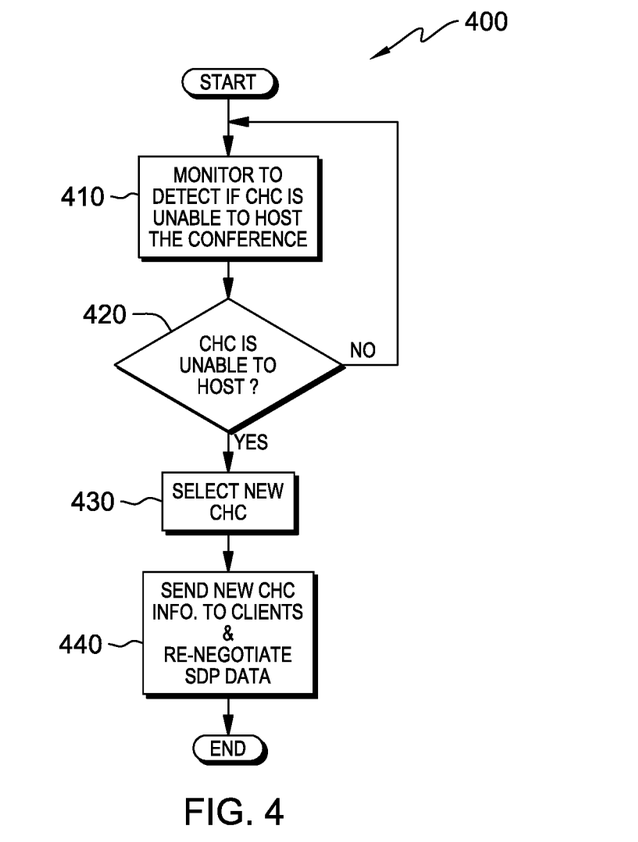
FIG. 4 illustrates the operational steps of a conference hosting candidate (CHC) replacement module, operating in conjunction with a conference hosting candidate selection program, inserted on a computing device within the audio-video conferencing environment of FIG. 1, in accordance with an embodiment of the present invention.

FIG. 4 illustrates the operational steps of CHC replacement module 400, operating as a modular component of conference hosting candidate selection program 300, inserted on a computing device within the audio-video conferencing environment of FIG. 1, in accordance with an embodiment of the present invention. During the audio-video conference, in which a CHC has been selected, CHC replacement program 400 monitors the conference to determine if the CHC is unable to host the conference transmission (step 410).

In one embodiment of the present invention, the CHC is selected to perform conference hosting functions in the event of an MCU failure being detected. In other embodiments, a new CHC is selected to replace the current CHC if the current CHC is unable to serve as a potential host of the conference after being selected as the current CHC. CHC replacement module 400 may receive input from the MHM or the conference manager related to the connection status of the current CHC and/or the network performance of the CHC's connection.

CHC replacement program 400 determines if the CHC is unable to host the conference (decision step 420), and determining that the CHC is unable to host the conference, CHC replacement program 400 selects a new CHC (step 430). The current CHC may be unable to host the conference due to leaving the conference or network performance. This may be an inadvertent occurrence due to network related issues, in which case the network connection of the CHC to the audio-video conference is lost. For example, client endpoint 110 may be selected as the current CHC, and CHC replacement program 400 receives input detecting that client endpoint 110 is no longer connected to the conference. Examples of inadvertent disconnection from the conference may include a power outage or a network routing failure. Client endpoint 110, as the CHC, may also intentionally leave the conference by manually disconnecting, due to local conditions or situations.

In another embodiment of the present invention, the CHC may be unable to host the conference due to local conditions affecting the receipt of incoming conference content and the frame rate/bit rate of out-going transmission content. If the frame rate or bit rate violates a pre-determined threshold level, the conference is at risk of failing to maintain a steady stream of content, or being abruptly terminated. In response CHC replacement program 400 selects a new CHC from the other client endpoints connected to the conference, for example, client endpoint 120.

Having selected a new CHC, CHC replacement program 400 sends information associated with the new CHC to client endpoints connected to the conference, and re-negotiates the SDP data with each client endpoint (step 440). CHC replacement program 400 distributes the network IP and port information associated with the new CHC and re-negotiates the session description protocol data with all the clients connected to the conference. CHC replacement program 400 also negotiates with the new CHC, defining the new role of the client endpoint chosen as the new CHC.

In one embodiment of the present invention, depending on the network bandwidth, the client-side hosting may lower the bit rate of conference content transmissions, or may remove video in order to make efficient use of resources available. If two client endpoints are detected as remaining connected to the conference, conference hosting candidate selection program 300 will degrade the conference to a person-to-person call. If only one participant is detected as being connected to the call (after a pre-determined duration default from the initiation of the conference), conference hosting candidate selection program 300 will end the conference.

Figure 5:
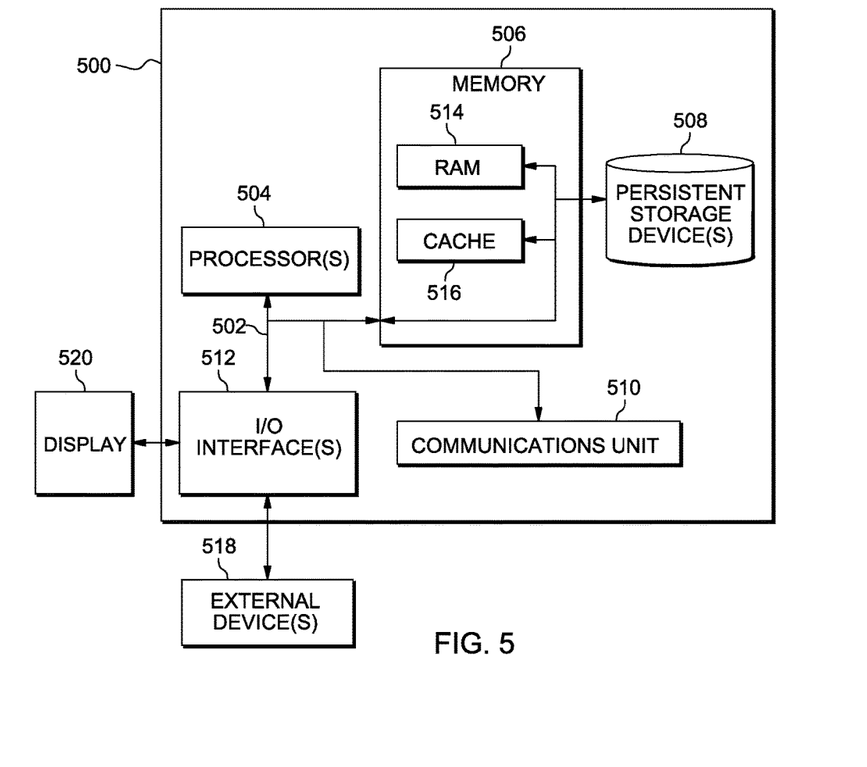
FIG. 5 depicts a block diagram of components of a computing device capable of executing a conference hosting candidate selection program and a CHC replacement module, in accordance with an embodiment of the present invention.

FIG. 5 depicts a block diagram of components of computing device 500 capable of executing conference hosting candidate selection program 300 and CHC replacement program 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500, which for example, could be conference manager server 140, includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Conference hosting candidate selection program 300 and CHC replacement program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of conference manager server 140, and client endpoints 110, 120, and 130. In these examples, communications unit 510 includes one or more network interface cards. Communications unit 510 may provide communications through the use of either or both physical and wireless communications links. Conference hosting candidate selection program 300 and CHC replacement program 400 may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., conference hosting candidate selection program 300 and CHC replacement program 400, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for maintaining an audio-video conference, the method comprising:
    a computing device, receiving session description protocol information from a plurality of client devices participating in an audio-video conference hosted by a primary conference host;
    the computing device selecting a client device as a secondary conference host from the plurality of client devices participating in the audio-video conference, based on client endpoint user profiles of the plurality of client devices participating in the audio-video conference;
    in response to receiving the session description protocol information from the plurality of client devices, the computing device sending a reply, including network parameter information identifying the secondary audio-video conference host, to the plurality of client devices participating in the audio-video conference;
    the computing device determining a violation of a threshold limit of a transmission rate of the primary conference host affecting the audio-video conference; and
    in response to determining the violation of the threshold limit of the transmission rate, the computing device sending information associated with activating the secondary conference host as a host of the audio-video conference, to the plurality of client devices participating in the audio-video conference, and sending the protocol information of the audio-video conference prior to the failure, to the client device selected as the secondary conference host.

2. The method of claim 1, wherein the session description protocol information of the plurality of client devices includes an Internet protocol (IP) address, a port number, and information associated with compression and decompression (codec) capabilities of the plurality of client devices.

3. The method of claim 1, wherein at least one client device participating in the audio-video conference is configured to perform audio-video mixing of content.

4. The method of claim 1, wherein the primary conference host of the audio-video conference is a multipoint control unit (MCU).

5. The method of claim 1, wherein the violation of the threshold limit of the transmission rate of the primary conference host includes, at least one of, a termination of audio-video conference supporting hardware of the primary conference host, a termination of audio-video conference supporting software of the primary conference host, and a termination of a network connection of the primary conference host, to the audio-video conference.

6. The method of claim 1, further comprising:
the computing device selecting the secondary conference host from the plurality of client devices, other than the primary conference host, based on at least one of a privileged role of a user of one of the plurality of client devices, and network performance of each client device of the plurality of client devices.

7. The method of claim 1, further comprising:
the computing device determining a failure of the secondary conference host affecting the audio-video conference, wherein the failure is based, at least in part, on a violation of a threshold limit of a transmission rate of the secondary conference host;
in response to determining the failure of the secondary conference host, the computing device selecting a tertiary conference host from the plurality of client devices participating in the audio-video conference, other than the primary conference host and the secondary conference host; and
the computing device sending information associated with activating the tertiary conference host as a host of the audio-video conference, to the plurality of client devices participating in the audio-video conference.

8. The method of claim 7, wherein the failure of the secondary conference host includes, at least in part, a termination of audio-video conference supporting hardware of the secondary conference host, a termination of audio-video conference supporting software of the secondary conference host, or a termination of a network connection of the secondary conference host, to the audio-video conference.

9. A computer program product for maintaining an audio-video conference, the computer program product comprising a computer readable storage medium having program instructions embodied therewith, the program instructions readable by a processor to cause the processor to perform a method comprising:
receiving session description protocol information from a plurality of client devices participating in an audio-video conference hosted by a primary conference host;
selecting a client device as a secondary conference host from the plurality of client devices participating in the audio-video conference, based on client endpoint user profiles of the plurality of client devices participating in the audio-video conference;
in response to receiving the session description protocol information from the plurality of client devices, sending a reply, including network parameter information identifying the secondary audio-video conference host, to the plurality of client devices participating in the audio-video conference;
determining a violation of a threshold limit of a transmission rate of the primary conference host affecting the audio-video conference; and
in response to determining the violation of the threshold limit of the transmission rate, sending information associated with activating the secondary conference host as a host of the audio-video conference, to the plurality of client devices participating in the audio-video conference, and sending the protocol information of the audio-video conference prior to the failure, to the client device selected as the secondary conference host.

10. The computer program product of claim 9, wherein the session description protocol information of the plurality of client devices includes an Internet protocol (IP) address, a port number, and information associated with compression and decompression (codec) capabilities of the plurality of client devices.

11. The computer program product of claim 9, wherein at least one client device participating in the audio-video conference is configured to perform audio-video mixing of content.

12. The computer program product of claim 9, wherein the failure of the primary conference host includes at least one of, a termination of audio-video conference supporting hardware of the primary conference host, a termination of audio-video conference supporting software of the primary conference host, and a termination of a network connection of the primary conference host, to the audio-video conference.

13. The computer program product of claim 9, further comprising:
determining a failure of the secondary conference host affecting the audio-video conference, wherein the failure is based, at least in part, on a violation of a threshold limit of a transmission rate of the secondary conference host; and
in response to determining the failure of the secondary conference host, selecting a tertiary conference host from the plurality of client devices participating in the audio-video conference, other than the primary conference host and the secondary conference host; and
sending information associated with activating the tertiary conference host as a host of the audio-video conference, to the plurality of client devices participating in the audio-video conference.

14. The computer program product of claim 13, wherein the violation of the threshold limit of the transmission rate of the primary conference host includes, at least one of, a termination of audio-video conference supporting hardware of the primary conference host, a termination of audio-video conference supporting software of the primary conference host, and a termination of a network connection of the primary conference host, to the audio-video conference.

15. The computer program product of claim 13, further comprising:
selecting a tertiary conference host from the plurality of client devices, other than the primary conference host and the secondary conference host, based on at least one of a privileged role of a user of one of the plurality of client devices, and network performance of each client device of the plurality of client devices.

16. A computer system for maintaining an audio-video conference, the computer system comprising:
one or more computer processors;
one or more computer-readable storage media;
program instructions stored on the computer-readable storage media for execution by at least one of the one or more processors, the program instructions comprising:
program instructions to receive session description protocol information from a plurality of client devices participating in an audio-video conference hosted by a primary conference host;
program instructions to select a client device as a secondary conference host from the plurality of client devices participating in the audio-video conference, based on client endpoint user profiles of the plurality of client devices participating in the audio-video conference;
in response to receiving the session description protocol information from the plurality of client devices, program instructions to send a reply, including network parameter information identifying the secondary audio-video conference host, to the plurality of client devices participating in the audio-video conference;

program instructions to determine a violation of a threshold limit of a transmission rate of the primary conference host affecting the audio-video conference; and in response to determining the violation of the threshold limit of the transmission rate, program instructions to send information associated with activating the secondary conference host as a host of the audio-video conference, to the plurality of client devices participating in the audio-video conference, and sending the protocol information of the audio-video conference prior to the failure, to the client device selected as the secondary conference host.

17. The computer system of claim 16, wherein at least one client device connected to the audio-video conference is configured to perform audio-video mixing of content.

18. The computer system of claim 16, wherein the violation of the threshold limit of the transmission rate of the primary conference host includes, at least one of, a termination of audio-video conference supporting hardware of the primary conference host, a termination of audio-video conference supporting software of the primary conference host, and a termination of a network connection of the primary conference host, to the audio-video conference.

19. The computer system of claim 16, further comprising:
program instructions to determine that the transmission rate of the secondary conference host violates a pre-determined bit rate/frame rate threshold;

in response to determining the transmission rate of the secondary conference host violates the pre-determined bit rate/frame rate threshold, program instructions to select a tertiary conference host from the plurality of client devices participating in the audio-video conference, other than the primary conference host and the secondary conference host; and program instructions to send network information associated with the tertiary conference host, to the plurality of client devices participating in the audio-video conference.

20. The computer system of claim 16, wherein the violation of the threshold limit of the transmission rate includes, at least one of, a termination of audio-video conference supporting hardware of the secondary conference host, a termination of audio-video conference supporting software of the secondary conference host, or a termination of a network connection of the secondary conference host, to the audio-video conference.

* * * * *